(12) United States Patent
Taylor

(10) Patent No.: US 12,361,623 B2
(45) Date of Patent: Jul. 15, 2025

(54) AVATAR GENERATION AND AUGMENTATION WITH AUTO-ADJUSTED PHYSICS FOR AVATAR MOTION

(71) Applicant: Sony Interactive Entertainment Inc., Tokyo (JP)

(72) Inventor: Michael Taylor, San Bruno, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 202 days.

(21) Appl. No.: 18/095,501

(22) Filed: Jan. 10, 2023

(65) Prior Publication Data
US 2024/0233231 A1    Jul. 11, 2024

(51) Int. Cl.
| | |
|---|---|
| *G06T 13/40* | (2011.01) |
| *A63F 13/57* | (2014.01) |
| *A63F 13/63* | (2014.01) |
| *G06F 3/04845* | (2022.01) |

(52) U.S. Cl.
CPC .............. *G06T 13/40* (2013.01); *A63F 13/57* (2014.09); *A63F 13/63* (2014.09); *G06F 3/04845* (2013.01); *G06T 2200/24* (2013.01)

(58) Field of Classification Search
CPC ..... G06T 13/40; G06T 2200/24; A63F 13/57; A63F 13/63; A63F 13/58; G06F 3/04845; G06F 3/011
See application file for complete search history.

(56) References Cited

U.S. PATENT DOCUMENTS

| | | | | |
|---|---|---|---|---|
| 10,325,417 | B1* | 6/2019 | Scapel ................... | G06T 19/20 |
| 10,388,071 | B2* | 8/2019 | Rico ..................... | G06T 19/003 |
| 2006/0143569 | A1* | 6/2006 | Kinsella .............. | G06Q 10/107 |
| | | | | 715/752 |
| 2016/0086500 | A1* | 3/2016 | Kaleal, III .............. | A61B 5/20 |
| | | | | 434/257 |
| 2016/0274662 | A1* | 9/2016 | Rimon ..................... | G06F 3/16 |

(Continued)

OTHER PUBLICATIONS

Uriel Singer et al: "Make-A-Video: Text-to-Video Generation without Text-Video Data", arxiv.org, Cornell University Library,2010 Linlibrary Cornell University Ithaca, NY 14853, Sep. 29, 2022 (Sep. 29, 2022) (Year: 2022).*

(Continued)

*Primary Examiner* — Michael Le
(74) *Attorney, Agent, or Firm* — Kilpatrick Townsend & Stockton LLP

(57) ABSTRACT

A method including accessing an avatar including a plurality of physiological characteristics, wherein the avatar includes a plurality of motion profiles. The method including receiving editing of a motion profile of the avatar via a user interface. The method including modifying each of the plurality of motion profiles to be consistent with the motion profile that edited. The method including automatically generating a prompt to apply the motion profile that is edited to the avatar, wherein the prompt is provided as input for an image generation artificial intelligence system configured to implement latent diffusion. The method including generating a sequence of video frames using the image generation artificial intelligence system showing the avatar in motion based on the motion profile that is edited. The method including presenting the sequence of video frames in the user interface.

20 Claims, 9 Drawing Sheets

(56) References Cited

U.S. PATENT DOCUMENTS

| | | | | |
|---|---|---|---|---|
| 2017/0278306 | A1* | 9/2017 | Rico | G02B 27/0093 |
| 2020/0356590 | A1* | 11/2020 | Clarke | G06F 3/0482 |
| 2021/0233317 | A1* | 7/2021 | Son | G16H 50/30 |
| 2022/0379170 | A1* | 12/2022 | Menaker | G06V 40/23 |
| 2023/0130555 | A1* | 4/2023 | Wang | G16H 30/40 |
| | | | | 434/257 |
| 2023/0260182 | A1* | 8/2023 | Saito | G06T 17/00 |
| | | | | 345/474 |
| 2023/0386522 | A1* | 11/2023 | Buzinover | G11B 27/036 |
| 2024/0104789 | A1* | 3/2024 | Ghosh | G06F 40/35 |
| 2024/0135514 | A1* | 4/2024 | Pakhomov | G06T 5/60 |

OTHER PUBLICATIONS

Jonathan Ho et al:"Imagen Video: High Definition Models", rxiv.org, Cornell University Library, 201 Olin Library Cornell University Ithaca, NY 14853, Oct. 5, 2022 (Year: 2022).*

Uriel Singeret al: "Make-A-Video: Text-to-Video Generation Without Text-Video Data", arxiv.org, Cornell University Library, 2010 Linlibrary Cornell University Ithaca, NY 14853, Sep. 29, 2022 (Sep. 29, 2022) (Year: 2022).*

ISR WO PCT/US2023/085238, dated Apr. 19, 2024, Total 12 pages.

Uriel Singer et al: "Make-A-Video: Text-to-Video Generation without Text-Video Data", arxiv.org, Cornell University Library, 201 Olin Library Cornell University Ithaca, NY 14853, Sep. 29, 2022 (Sep. 29, 2022), XP091329905, * sections 3.1, 3.2, 3.3 *, * section 2, [1], [4] *; figures 1,2,4.

Kaiduo Zhang et al: HumanDiffusion: a Coarse-to-Fine Alignment Diffusion Framework for Controllable Text-Driven Person Image Generation,arxiv.org, Cornell University Library, 201 Olin Library Cornell University Ithaca, NY 14853, Nov. 11, 2022 (Nov. 11, 2022), XP091366450, * section 1, last paragraph; section 2.2; section 3, esp. 3.3; sections 4.1.2, 4.2, 4.3 *; figures 1,2,6,7,8.

Jonathan Ho et al: "Imagen Video: High Definition Models", rxiv.org, Cornell University Library, 201 Olin Library Cornell University Ithaca, NY 14853, Oct. 5, 2022 (Oct. 5, 2022), XP091334501, * section 1, last paragraph; section 2, esp. 2.1, 2.2, 2.3 *; abstract; figures 2,3,6,7.

Starke Sebastian et al: "DeepPhase", ACM Transactions on Graphics, ACM, NY, US, vol. 41, No. 4, Jul. 22, 2022 (Jul. 22, 2022), pp. 1-13, XP059192210, ISSN: 0730-0301, DOI: 10.1145/3528223.3530178 * p. 136:2, [1].

* cited by examiner

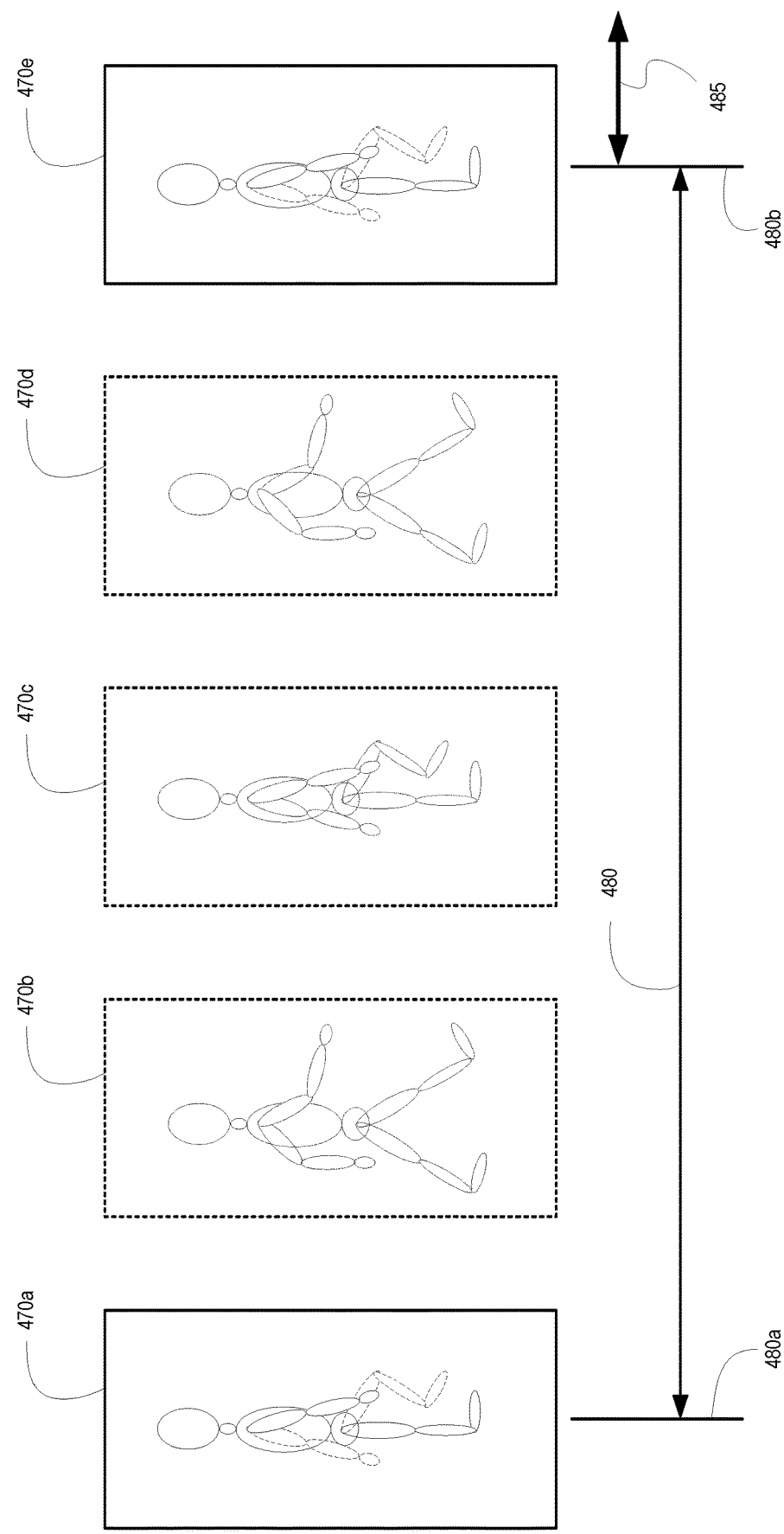

AVATAR GENERATION AND AUGMENTATION WITH AUTO-ADJUSTED PHYSICS FOR AVATAR MOTION

TECHNICAL FIELD

The present disclosure is related to avatar generation, such as during development of a sequence of images including the avatar as content, including content for a video game, and more specifically to the modification of a physiological characteristic of the avatar and/or a motion profile of the avatar, aligning related motion profiles of the avatar to be consistent with the modification, and generating an image and/or sequence of images of the avatar in motion based on the motion profiles that have been modified using an image generation artificial intelligence system configured to implement latent diffusion.

BACKGROUND OF THE DISCLOSURE

Video games and/or gaming applications and their related industries (e.g., video gaming) are extremely popular and represent a large percentage of the worldwide entertainment market. Development of video games involves the generation of a character and motions for that character. A motion sequence may be generated for images in sequential order.

Development of the character may involve many steps to reach a final shape and motion of the character. Changes to the character may be made during development of the corresponding video game, or because the character may be used in another video game, and as such the character would be modified for uniqueness between video game characters. Making changes to the character may require retracing steps in order to finalize the shape and motion of the character. That is, a change in the character may not be consistent with other characteristics including motions of that character. For example, changing a physical characteristic of the character may affect the motions of that character. As such, each of the motions would have to be edited and/or modified to be consistent with the character changes. In addition, if one motion of the avatar has changed, even though the physical characteristics have not changed, then each of the other motions of the character would have to be modified separately to be in alignment with the changed motion.

It is in this context that embodiments of the disclosure arise.

SUMMARY

Embodiments of the present disclosure relate to generation of an avatar and one or more images including the avatar, such as during development of a video game to include the development of an avatar or object, wherein an image or sequence of images can be generated using an artificial intelligence (AI) image generation model implementing latent diffusion techniques. More specifically, a modification can be made to a parameter of an avatar, wherein the parameter may define a physiological characteristic and/or a motion profile, for example, and other modifications to other parameters, including other motion profiles, can be made to be consistent with the original modification to the avatar. A prompt can be generated reflecting the modification and resulting modifications to the parameters of the avatar for generation of an image or sequence of images showing a motion of the avatar, wherein the prompt is provided as input into an image generation artificial intelligence system configured to implement latent diffusion to generate the image and/or sequence of images showing the motion of the avatar.

In one embodiment, a method is disclosed. The method including accessing an avatar including a plurality of physiological characteristics, wherein the avatar includes a plurality of motion profiles. The method including receiving editing of a motion profile of the avatar via a user interface. The method including modifying each of the plurality of motion profiles to be consistent with the motion profile that edited. The method including automatically generating a prompt to apply the motion profile that is edited to the avatar, wherein the prompt is provided as input for an image generation artificial intelligence system configured to implement latent diffusion. The method including generating a sequence of video frames using the image generation artificial intelligence system showing the avatar in motion based on the motion profile that is edited. The method including presenting the sequence of video frames in the user interface.

In another embodiment, a non-transitory computer-readable medium storing a computer program for implementing a method is disclosed. The computer-readable medium including program instructions for accessing an avatar including a plurality of physiological characteristics, wherein the avatar includes a plurality of motion profiles. The computer-readable medium including program instructions for receiving editing of a motion profile of the avatar via a user interface. The computer-readable medium including program instructions for modifying each of the plurality of motion profiles to be consistent with the motion profile that edited. The computer-readable medium including program instructions for automatically generating a prompt to apply the motion profile that is edited to the avatar, wherein the prompt is provided as input for an image generation artificial intelligence system configured to implement latent diffusion. The computer-readable medium including program instructions for generating a sequence of video frames using the image generation artificial intelligence system showing the avatar in motion based on the motion profile that is edited. The computer-readable medium including program instructions for presenting the sequence of video frames in the user interface In still another embodiment, a computer system is disclosed, wherein the computer system includes a processor and memory coupled to the processor and having stored therein instructions that, if executed by the computer system, cause the computer system to execute a method. The method including accessing an avatar including a plurality of physiological characteristics, wherein the avatar includes a plurality of motion profiles. The method including receiving editing of a motion profile of the avatar via a user interface. The method including modifying each of the plurality of motion profiles to be consistent with the motion profile that edited. The method including automatically generating a prompt to apply the motion profile that is edited to the avatar, wherein the prompt is provided as input for an image generation artificial intelligence system configured to implement latent diffusion. The method including generating a sequence of video frames using the image generation artificial intelligence system showing the avatar in motion based on the motion profile that is edited. The method including presenting the sequence of video frames in the user interface.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIG. 4D illustrates an interface configured to enable modification of a motion profile, corresponding to walking and/or running, of an avatar via user manipulation of key frames, in accordance with one embodiment of the present disclosure.

DETAILED DESCRIPTION

Figure 1:
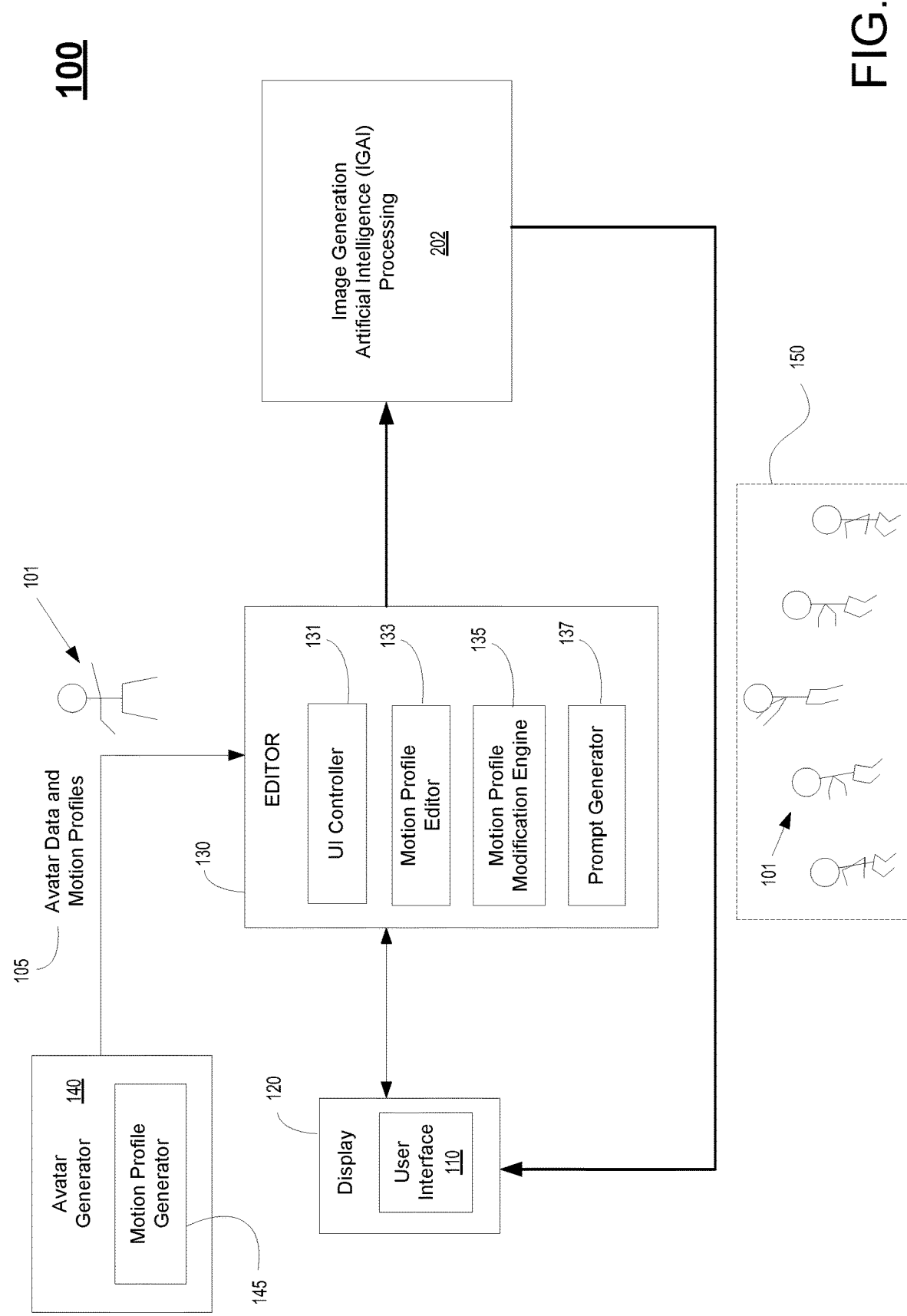
FIG. 1 illustrates a system configured for the automatic modification of all motion profiles to be consistent with a motion profile of an avatar that has been edited, and the generation of an image or sequence of images showing the avatar in motion using an AI image generation model implementing latent diffusion techniques based on the motion profiles that have been modified and/or generated, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods providing for the development of an avatar and motions of the avatar, such as during development of a video game. In particular, in response to an editing of a parameter of an avatar, wherein the parameter may define a physiological characteristic and/or motion profile of the avatar, related motion profiles of the avatar are automatically modified to be consistent with the editing of the parameter. A user interface enables the user to make edits to the avatar (e.g., characteristics, motion profiles, etc.), and to view the avatar and the changes made to the avatar. Further, an image or sequence of images of the avatar can be generated using an image generation artificial intelligence (IGAI) model implementing latent diffusion techniques based on the modifications to the parameters (e.g., physiological characteristics and/or motion profiles) of the avatar. An input (e.g., prompt, image, text, or combinations thereof) is generated based on the modifications to the parameters (e.g., physiological characteristics and/or motion profiles) of the avatar. In that manner, the user can view the motion profiles associated with changes being made to the avatar, such as via the user interface.

Advantages of embodiments of the present disclosure include providing an intuitive and/or visual way to make modifications to an avatar under development, and for viewing how those changes affect one or more motions of the character. For example, a user interface may be configured to provide one or more interfaces enabling for the modification of parameters defining physiological characteristics and/or motion profiles of the avatar. The modifications trigger the automatic modification of one or more motion profiles of the avatar to be consistent with editing of a corresponding parameter defining a physiological characteristic and/or a motion profile. The user interface may be configured to present an image and/or sequence of images showing the avatar in motion based on the changes made to the avatar. In addition, other advantages include reducing the time to develop an avatar. That is, instead of manually changing each of a variety of motion profiles of an avatar to be consistent with a change to a parameter (e.g., defining a physiological characteristic and/or motion profile) made to the avatar, all the motion profiles are automatically modified.

Throughout the specification, the reference to "game" or "video game" or "gaming application" is meant to represent any type of interactive application that is directed through execution of input commands. For illustration purposes only, an interactive application includes applications for gaming, word processing, video processing, video game processing, etc. Also, the terms "virtual world" or "virtual environment" or "metaverse" is meant to represent any type of environment generated by a corresponding application or applications for interaction between a plurality of users in a multi-player session or multi-player gaming session. Further, the terms introduced above are interchangeable.

With the above general understanding of the various embodiments, example details of the embodiments will now be described with reference to the various drawings.

FIG. 1 illustrates a system 100 configured for the automatic modification of all motion profiles to be consistent with a parameter defining a physiological characteristic and or a motion profile of an avatar that has been edited, and the generation of an image or sequence of images showing the avatar in motion using an AI image generation model implementing latent diffusion techniques based on the changes to the avatar, such as motion profiles that have been modified and/or generated, in accordance with one embodiment of the present disclosure. For example, system 100 may be implemented during development of a video game, such as when developing an avatar.

As shown, system 100 includes an avatar generator 140. For example, a user may wish to develop an avatar 101 for use in one or more video games. In general, using the avatar generator 130, the user can define how the avatar looks, such as the shape of the avatar, etc. For instance, one or more physiological characteristics may be defined for the avatar, to include how the avatar is presented in a scene (e.g., physical characteristics), how heavy the avatar is, how big the avatar is, the skeletal construction of the avatar, physical laws applicable to the avatar, etc. The avatar may look like any species familiar to Earth, such as a human, or may be generated as a fantastic other world creature.

In addition, a motion profile generator 145 is included within and/or works closely with the avatar generator 140. In particular, a user is able to develop a suite or plurality of motion profiles for the avatar, wherein each motion profile defines a particular motion (e.g., walking, running, jumping, swimming, hand raising, finger spreading, etc.) for the avatar. For instance, a default suite of motion profiles may be assigned by the motion profile generator 145, at least when initializing the avatar 101. The user may modify any of the initial motion profiles using the motion profile generator 145, in one implementation. In another instance, one or more motion profiles may be newly generated from the ground up by the user via the motion profile generator. These newly generated motion profiles may be included with other initialized motion profiles, or may stand-alone as a completely new suite of motion profiles for the avatar.

As a result, the avatar generator 140 is configured to generate an avatar 101, which includes data 105 related to the avatar. For example, the data 105 may include a plurality of motion profiles for the avatar 101 that have been developed using the avatar generator 140. The data 105 may also include a plurality of physiological characteristics of the avatar 101.

While embodiments of the present disclosure are described within the context of developing avatars, it is understood that the present embodiments are well suited to the development of objects in general. That is, embodiments of the present disclosure are well suited for the automatic modification of physiological characteristics and/or motion profiles of an object to be consistent with a motion profile that has been edited, and the generation of an image or sequence of images showing the object in motion using an AI image generation model implementing latent diffusion techniques based on the motion profiles that have been modified and/or generated.

System 100 includes editor 130 that is configured for facilitating editing of a parameter of avatar 101, wherein the parameter may define a physiological characteristic and/or a motion profile of avatar 101. In particular, editor 130 acts on the data 105 (e.g., including physiological characteristics, motion profiles, etc.) of avatar 101. As shown, the avatar generator 140 may be used during development of the avatar 101, such as to output the data 105, including for example the motion profiles, of the avatar 101. In addition, editor 130 is able to operate on any avatar provided as input, as long as there is sufficient data associated with the avatar. For example, the avatar may have been previously generated and includes associated data (e.g., including a suite of motion profiles) suitable for use by the editor 130.

Editor 130 includes a user interface (UI) controller 131 that is configured to control and/or manage a corresponding UI to facilitate editing of an avatar by a user, such as via the editor 130. For example, the UI controller 131 controls the presentation of the UI 110 shown on display 120 for viewing by the user. For example, the UI 110 may present information to the user via the UI 110 related to the avatar. The UI controller 131 may also control the display of images and/or a sequence of images in the UI 110. In addition, the UI controller 131 is configured to manage an interface configured to receive user inputs, such as those used to modify one or more parameters of the avatar, such as those parameters defining physiological characteristics and/or motion profiles of the avatar.

In addition, editor 130 includes a motion profile editor 133 that is configured to facilitate the editing of any parameter associated with the avatar 101. For example, the motion profile editor 133 may be configured to enable editing of a parameter associated with a corresponding physiological characteristic of the avatar 101. In addition, the motion profile editor 133 may be configured to enable editing of parameter associated with a corresponding motion profile of the avatar 101. That is, the motion profile editor 133 allows for editing of the avatar, such as editing of a physiological characteristic, or a motion profile of the avatar.

Editor 130 includes a motion profile modification engine 135 that is configured to modify one or more elements of data 105 associated with avatar 101 to be consistent with the editing of the parameter previously done by a user (e.g., via the motion profile editor 133). For example, the user may have modified a physiological characteristic of the avatar 101 by providing an instruction to make the avatar heavier, or may have modified a motion profile of the avatar (by itself, or in response to a change in the physiological characteristic). In that manner, once the avatar has been changed (e.g., via an editing of a parameter of the avatar), the motion profile modification engine 135 is configured to modify each of the motion profiles associated with the avatar 101 to be consistent with the change to the avatar.

Editor 130 includes prompt generator 137 configured to generate a prompt based on the changes made to the avatar 101, including the parameter that has been edited and/or the modifications made to motion profiles (and/or other physiological characteristics) in response to the edited parameter. The prompt is provided as input to an image generation artificial intelligence (IGAI) processing model 202 that is configured to generate an image or sequence of images based on the prompt using latent diffusion techniques. For example, the image is generated using input provided in various formats, such as text, or images, etc., as will be further described in FIGS. 2A-2C. In that manner, the user is able to view how changes made to an avatar affect one or more motion profiles of that avatar. That is, the IGAI processing model is configured to generate an output including a motion sequence of the avatar that is based on changes made to the avatar and subsequent changes made to the motion profiles, as previously described.

For example, as shown IGAI processing model 202 generates a sequence of images 150 showing the avatar 101 in a jumping motion based on the prompt provided by the editor 130. The sequence of images 150 may be shown on the display 120, such as in the user interface. As such, the user is able to determine whether the changes to the avatar and the resulting changes made to the motion profiles are satisfactory. The user may make additional edits to the parameter (i.e., the corresponding physiological characteristic and/or motion profile, etc.) with resulting modifications to the plurality of motion profiles for consistency with the edits made by the user (e.g., to the parameter), and see another output generated by the IGAI processing model 202. In that manner, an iterative process may be implemented to tune the avatar and its characteristics (e.g., physiological characteristic, motion profiles, etc.) through one or more rounds of editing to force or guide the IGAI processing model to a specific, desired outcome, such as a developed avatar. A more detailed description of the operations performed by the IGAI processing model 202 to generate an image or sequence of images is provided in FIGS. 2A-2C.

In addition, a prompt generator 152 implements one of the modification processing operations 150, and is configured to convert the feedback that is translated into a prompt that can be provided as input to the IGAI processing model 202 to generate the modified image reflected of the feedback. In one embodiment, the newly generated prompt may be isolated to the feedback and is sufficient to allow the IGAI processing model 202 to generate the modified image 102. For example, the prompt may correspond to the feedback provided by the user to change the bag 106a to an aluminum can 106b. In one embodiment, the prompt may include information obtained from the original prompt provided as input to generate the original image 101.

In one embodiment, the generation of an output image or sequence of images, graphics, and/or three-dimensional representation by an image generation AI (IGAI), can include one or more artificial intelligence processing engines and/or models. In general, an AI model is generated using training data from a data set. The data set selected for training can be custom curated for specific desired outputs and in some cases the training data set can include wide ranging generic data that can be consumed from a multitude of sources over the Internet. By way of example, an IGAI should have access to a vast of amount of data, e.g., images, videos and three-dimensional data. The generic data is used by the IGAI to gain understanding of the type of content desired by an input. For instance, if the input is requesting the generation of a tiger in the Sahara desert, the data set should have various images of tigers and deserts to access and draw upon during the processing of an output image. The curated data set, on the other hand, may be be more specific to a type of content, e.g., video game related art, videos and other asset related content. Even more specifically, the curated data set could include images related to specific scenes of a game or actions sequences including game assets, e.g., unique avatar characters and the like. As described above, an IGAI can be customized to enable entry of unique descriptive language statements to set a style for the requested output images or content. The descriptive language statements can be text or other sensory input, e.g., inertial sensor data, input speed, emphasis statements, and other data that can be formed into an input request. The IGAI can also be provided images, videos, or sets of images to define the context of an input request. In one embodiment, the input can be text describing a desired output along with an image or images to convey the desired contextual scene being requested as the output.

In one embodiment, an IGAI is provided to enable text-to-image generation. Image generation is configured to implement latent diffusion processing, in a latent space, to synthesize the text to image processing. In one embodiment, a conditioning process assists in shaping the output toward the desired using output, e.g., using structured metadata. The structured metadata may include information gained from the user input to guide a machine learning model to denoise progressively in stages using cross-attention until the processed denoising is decoded back to a pixel space. In the decoding stage, upscaling is applied to achieve an image, video, or 3D asset that is of higher quality. The IGAI is therefore a custom tool that is engineered to processing specific types of input and render specific types of outputs.

When the IGAI is customized, the machine learning and deep learning algorithms are tuned to achieve specific custom outputs, e.g., such as unique image assets to be used in gaming technology, specific game titles, and/or movies.

In another configuration, the IGAI can be a third-party processor, e.g., such as one provided by Stable Diffusion or others, such as OpenAI's GLIDE, DALL-E, MidJourney or Imagen. In some configurations, the IGAI can be used online via one or more Application Programming Interface (API) calls. It should be understood that reference to available IGAI is only for informational reference. For additional information related to IGAI technology, reference may be made to a paper published by Ludwig Maximilian University of Munich titled "*High-Resolution Image Synthesis with Latent Diffusion Models*", by Robin Rombach, et al., pp. 1-45. This paper is incorporated by reference.

Figure 2A:
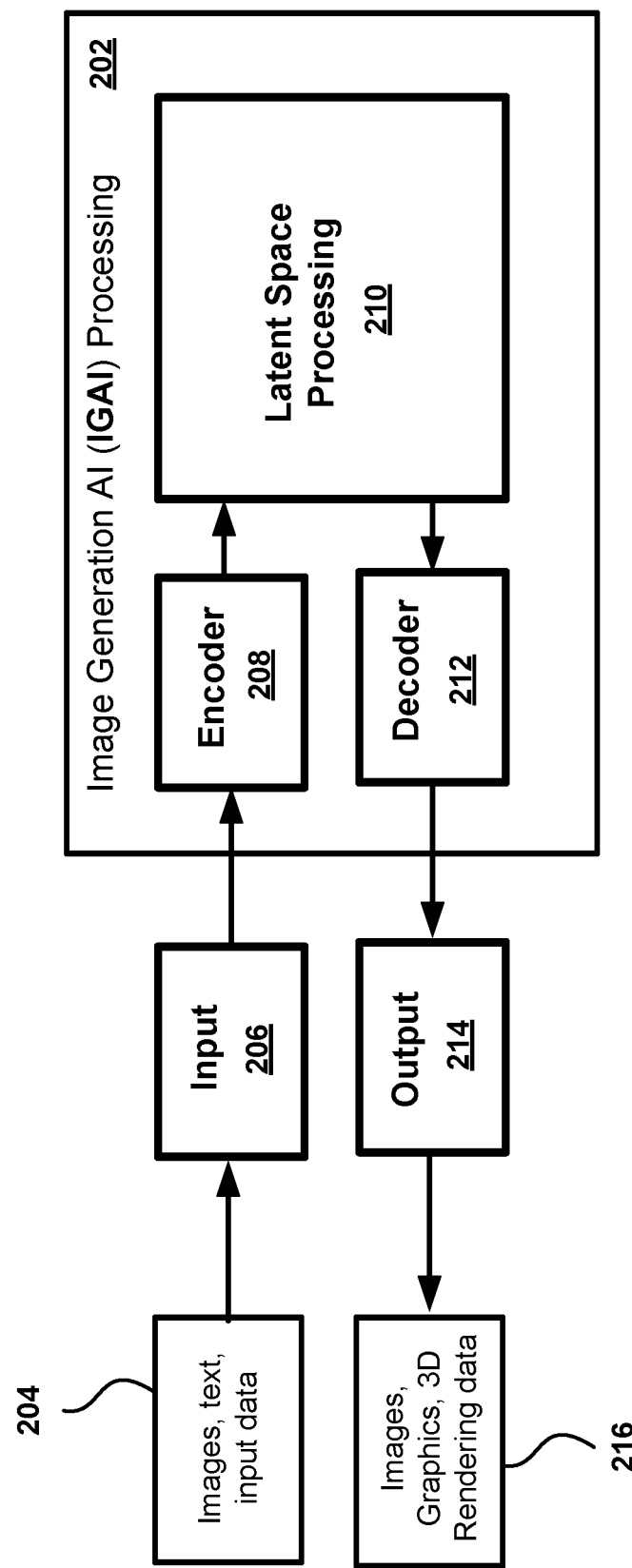
FIG. 2A is a general representation of an image generation AI (IGAI) processing sequence, in accordance with one embodiment.

FIG. 2A is a general representation of an image generation AI (IGAI) 202 processing sequence (also referred to as the IGAI processing model 202), in accordance with one embodiment. As shown, input 206 is configured to receive input in the form of data, e.g., text description having semantic description or key words. The text description can in the form of a sentence, e.g., having at least a noun and a verb. The text description can also be in the form of a fragment or simply one word. The text can also be in the form of multiple sentences, which describe a scene or some action or some characteristic. In some configuration, the input text can also be input in a specific order so as to influence the focus on one word over others or even deemphasize words, letters or statements. Still further, the text input can be in any form, including characters, emojis, ions, foreign language characters (e.g., Japanese, Chinese, Korean, etc.). In one embodiment, text description is enabled by contrastive learning. The basic idea is to embed both an image and text in a latent space so that text corresponding to an images maps to the same area in the latent space as the image. This abstracts out the structure of what it means to be a dog for instance from both the visual and textual representation. In one embodiment, a goal of contrastive representation learning is to learn an embedding space in which similar sample pairs stay close to each other while dissimilar ones are far apart. Contrastive learning can be applied to both supervised and unsupervised settings. When working with unsupervised data, contrastive learning is one of the most powerful approaches in self-supervised learning.

In addition to text, the input can also include other content, e.g., such as images or even images that have descriptive content themselves. Images can be interpreted using image analysis to identify objects, colors, intent, characteristics, shades, textures, three-dimensional representations, depth data, and combinations thereof. Broadly speaking, the input 206 is configured to convey the intent of the user that wishes to utilize the IGAI to generate some digital content. In the context of game technology, the target content to be generated can be a game asset for use in a specific game scene. In such a scenario, the data set used to train the IGAI and input 206 can be used to customized the way artificial intelligence, e.g., deep neural networks process the data to steer and tune the desired output image, data or three-dimensional digital asset.

The input 206 is then passed to the IGAI, where an encoder 208 takes input data and/or pixel space data and coverts into latent space data. The concept of "latent space" is at the core of deep learning, since feature data is reduced to simplified data representations for the purpose of finding patterns and using the patterns. The latent space processing 210 is therefore executed on compressed data, which significantly reduces the processing overhead as compared to processing learning algorithms in the pixel space, which is much more heavy and would require significantly more processing power and time to analyze and produce a desired image. The latent space is simply a representation of compressed data in which similar data points are closer together in space. In the latent space, the processing is configured to learn relationships between learned data points that a machine learning system has been able to derive from the information that it gets fed, e.g., the data set used to train the IGAI. In latent space processing 210, a diffusion process is computed using diffusion models. Latent diffusion models rely on autoencoders to learn lower-dimension representations of a pixel space. The latent representation is passed through the diffusion process to add noise at each step, e.g., multiple stages. Then, the output is fed into a denoising network based on a U-Net architecture that has cross-attention layers. A conditioning process is also applied to guide a machine learning model to remove noise and arrive at an image that represents closely to what was requested via user input. A decoder 212 then transforms a resulting output from the latent space back to the pixel space. The output 214 may then be processed to improve the resolution. The output 214 is then passed out as the result, which may be an image, graphics, 3D data, or data that can be rendered to a physical form or digital form.

Figure 2B:
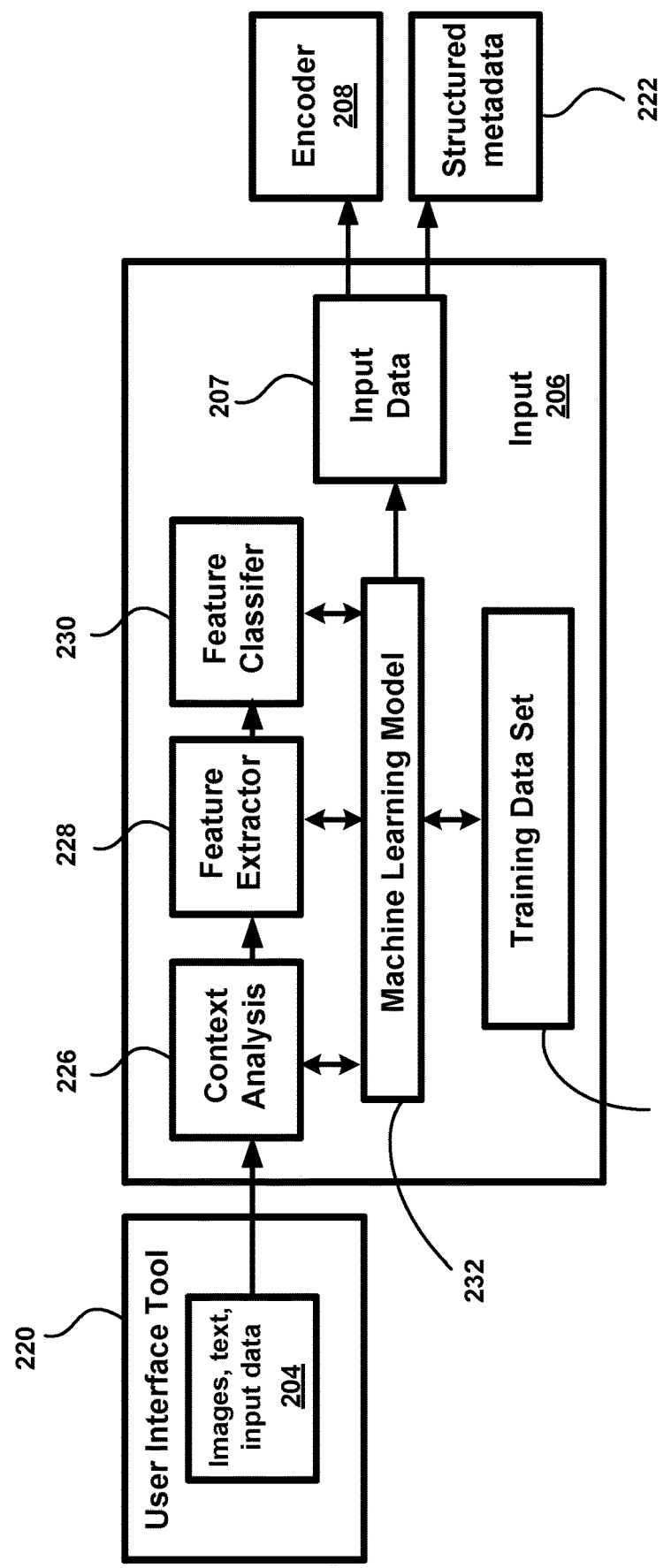
FIG. 2B illustrates additional processing that may be done to the input provided to the IGAI processing sequence described in FIG. 2A, in accordance with one embodiment of the present disclosure.

FIG. 2B illustrates, in one embodiment, additional processing that may be done to the input 206. A user interface tool 220 may be used to enable a user to provide an input request 204. The input request 204, as discussed above, may be images, text, structured text, or generally data. In one embodiment, before the input request is provided to the encoder 208, the input can be processed by a machine learning process that generates a machine learning model 232, and learns from a training data set 234. By way of example, the input data may be be processed to via a context analyzer 226 to understand the context of the request. For example, if the input is "space rockets for flying to the mars", the input can be analyzed 226 to determine that the context is related to outer space and planets. The context analysis may use machine learning model 232 and training data set 234 to find related images for this context or identify specific libraries of art, images or video. If the input request also includes an image of a rocket, the feature extractor 228 can function to automatically identify feature characteristics in the rocket image, e.g., fuel tank, length, color, position, edges, lettering, flames, etc. A feature classifier 230 can also be used to classify the features and improve the machine learning model 232. In one embodiment, the input data 207 can be generated to produce structured information that can be encoded by encoder 208 into the latent space. Additionally, it is possible to extract out structured metadata 222 from the input request. The structed metadata 222 may be, for example, descriptive text used to instruct the IGAI 202 to make a modification to a characteristic or change to the input images or changes to colors, textures, or combinations thereof. For example, the input request 204 could include an image of the rocket, and the text can say "make the rocket wider" or "add more flames" or "make it stronger" or some of other modifier intended by the user (e.g., semantically provided and context analyzed). The structured metadata 222 can then be used in subsequent latent space processing to tune the output to move toward the user's intent. In one embodiment, the structured metadata may be in the form of semantic maps, text, images, or data that is engineered to represent the user's intent as to what changes or modifications should be made an input image or content.

Figure 2C:
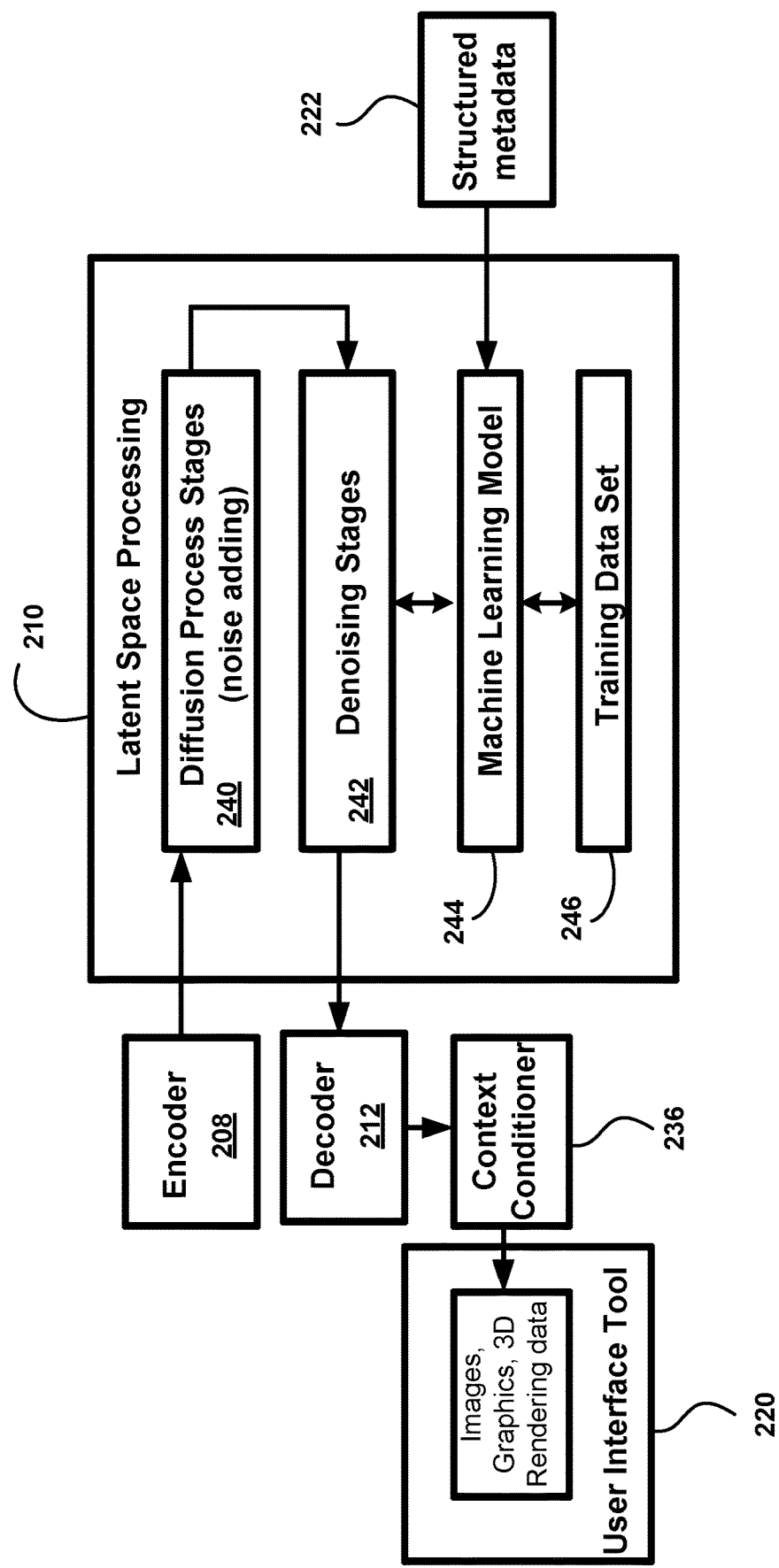
FIG. 2C illustrates how the output of the encoder used is then fed into latent space processing in the IGAI processing sequence, in accordance with one embodiment.

FIG. 2C illustrates how the output of the encoder 208 is then fed into latent space processing 210, in accordance with one embodiment. A diffusion process is executed by diffusion process stages 240, wherein the input is processed through a number of stages to add noise to the input image or images associated with the input text. This is a progressive process, where at each stage, e.g., 10-50 or more stages, noise is added. Next, a denoising process is executed through denoising stages 242. Similar to the noise stages, a reverse process is executed where noise is removed progressively at each stage, and at each stage, machine learning is used to predict what the output image or content should be, in light of the input request intent. In one embodiment, the structured metadata 222 can be used by a machine learning model 244 at each stage of denoising, to predict how the resulting denoised image should look and how it should be modified. During these predictions, the machine learning model 244 uses the training data set 246 and the structured metadata 222, to move closer and closer to an output that most resembles the requested in the input. In one embodiment, during the denoising, a U-Net architecture that has cross-attention layers may be used, to improve the predictions. After the final denoising stage, the output is provided to a decoder 212 that transforms that output to the pixel space. In one embodiment, the output is also upscaled to improve the resolution. The output of the decoder, in one embodiment, can be optionally run through a context conditioner 236. The context conditioner is a process that may use machine learning to examine the resulting output to make adjustments to make the output more realistic or remove unreal or unnatural outputs. For example, if the input asks for "a boy pushing a lawnmower" and the output shows a boy with three legs, then the context conditioner can make adjustments with in-painting processes or overlays to correct or block the inconsistent or undesired outputs. However, as the machine learning model 244 gets smarter with more training over time, there will be less need for a context conditioner 236 before the output is rendered in the user interface tool 220.

Figure 3:
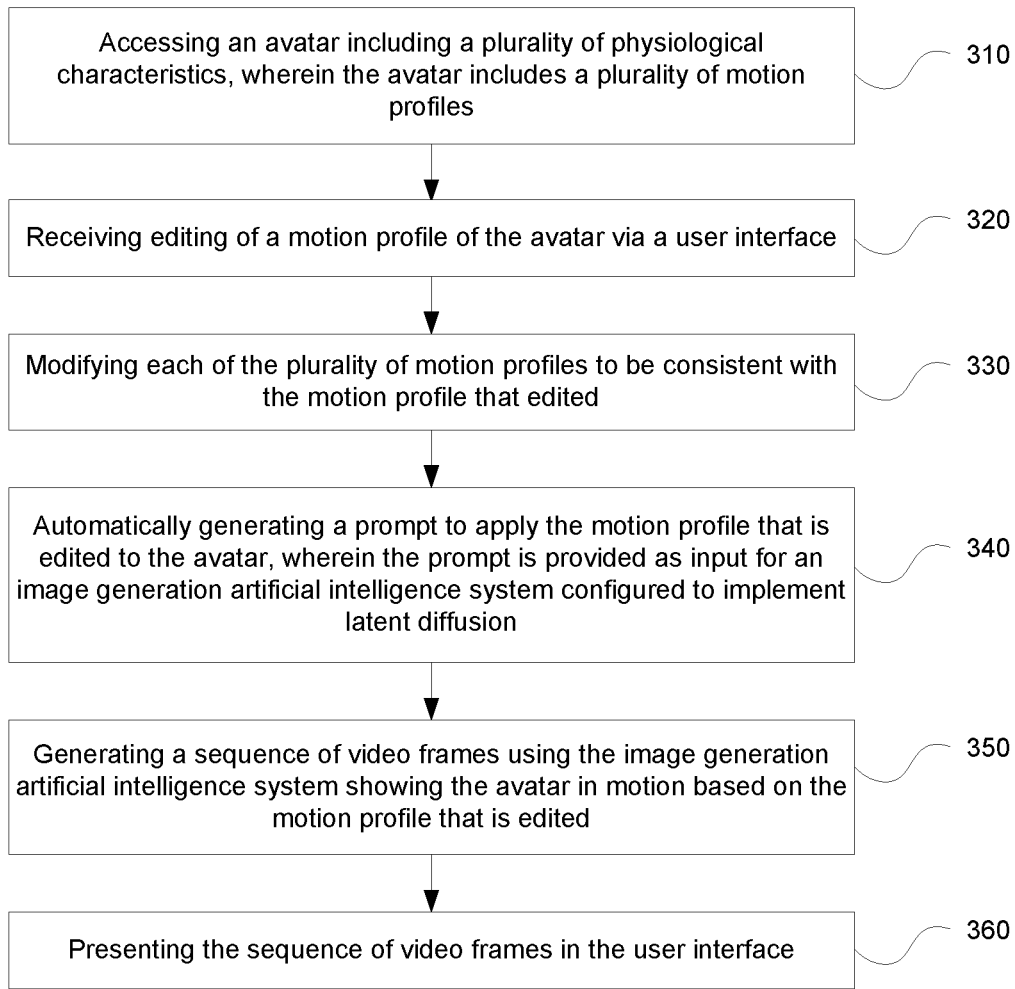
FIG. 3 is a flow diagram illustrating a method for automatically modifying a plurality of motion profiles of an avatar to be consistent with a motion profile of an avatar that has been edited, and the generation of an image or sequence of images showing the avatar in motion using an AI image generation model implementing latent diffusion techniques based on the motion profiles that have been modified and/or generated, in accordance with one embodiment of the present disclosure.

FIG. 3 is a flow diagram illustrating a method for automatically modifying a plurality of motion profiles of an avatar to be consistent with a motion profile of an avatar that has been edited, and the generation of an image or sequence of images showing the avatar in motion using an AI image generation model implementing latent diffusion techniques based on the motion profiles that have been modified and/or generated, in accordance with one embodiment of the present disclosure.

With the detailed description of the system 100 of FIG. 1 and the image generation AI (IGAI) 202 processing sequence of FIGS. 2A-2C, flow diagram 300 of FIG. 3 discloses a method for automatically modifying a plurality of motion profiles of an avatar to be consistent with an avatar that has been edited (e.g., editing of a physiological characteristic, motion profile, etc.), and the generation of an image or sequence of images showing the avatar in motion using an AI image generation model implementing latent diffusion techniques based on the motion profiles that have been modified and/or generated, in accordance with one embodiment of the present disclosure. The operations performed in the flow diagram may be implemented by one or more of the previously described components, and also system 100 described in FIG. 1, including, in part, user interface 110, editor 130, and/or IGAI processing model 202. In particular, flow diagram 300 may be implemented to develop an avatar by changing or editing a parameter of the avatar (i.e., related to a physiological characteristic, motion profile, etc.), have the system automatically modify a suite and/or a plurality of motion profiles of the avatar to be consistent with the editing, and based on a prompt related to the edits and modifications to the motion profiles having the IGAI processing model generate an image or sequence of images showing the avatar in motion based on the editing. Multiple iterations of editing of the avatar may provide for tuning of the avatar to a specific, desired outcome (i.e., an avatar with desired physiological characteristics and suite of motion profiles.

At 310, the method including accessing an avatar, wherein the avatar is associated with or includes a plurality of physiological characteristics, and/or includes a plurality of motion profiles. That is, the avatar may be in development using another application, wherein embodiments of the present disclosure provide for additional editing of the avatar that provides universal modifications to the avatar not normally performed, such as modifications to the suite of motion profiles based on the editing of one parameter of the avatar. In addition, the avatar (i.e., a first avatar) may be fully developed, and includes a finalized version of physiological characteristics and suite of motion profiles. In this case, the user may wish to develop a second avatar that based on the first avatar by providing edits to the finalized version of physiological characteristics and suite of motion profiles.

At 320, the method including receiving editing of a motion profile of the avatar via a user interface. That is, an edit to a parameter defining a physiological characteristic and/or a motion profile may be performed by the user. Not intending to be limiting, flow diagram 300 is described with respect to making an edit to a particular motion profile of the avatar. That is, changes to the motion profile may be provided by the user, such as via an editor and user interface as previously described. For example, a walking and/or running motion profile of the avatar may be changed by altering a parameter defining frequency, or amplitude, or speed, or stride, etc., related to a cycle of a walking/running motion. In another example, a jumping motion profile of the avatar may be edited by altering a parameter defining a height, or amplitude, etc. of a jumping motion. For purposes of illustration only, FIGS. 4A-4D illustrate multiple examples of editing of a motion profile.

In another implementation, the method includes receiving editing of a physiological characteristic of the avatar. That is, instead of editing a motion profile, a physiological characteristic may be changed. For example, the user may wish to change a weight of the avatar with a request to "make the avatar heavier," or "bigger," or "stronger," etc. Other examples of changing one or more physiological characteristics are contemplated and supported by embodiments of the present disclosure.

In some implementations, after a change to the physiological characteristic, the user may be prompted to edit a motion profile. For example, once the avatar has been made heavier, the suite of motion profiles for the avatar may not be consistent with the change. As an illustration, the avatar may now be heavier, or bigger and heavier, and may look awkward when shown running in a motion sequence that is generated using an original running motion profile for the avatar that was skinnier. As such, the user may wish to change the running motion profile through additional editing, such as lowering the speed, decreasing the stride, etc. That is, the running motion profile is edited by the user to be consistent with the original changes made to the avatar (e.g., make avatar heavier).

At 330, the method including modifying each of the plurality of motion profiles to be consistent with the motion profile that edited. That is, based on the parameter that has been edited (e.g., editing a parameter defining a physiological characteristic or motion profile), all the motion profiles associated with the avatar (e.g., a suite or plurality of motion profiles) are modified to be consistent with the editing.

In one implementation, the user may edit a motion profile of the editor, in one embodiment. For example, a representation of the motion profile may be displayed in a user interface, wherein manipulation of the motion profile may be performed by the user via the user interface, and received by the system (e.g., editor). In that manner, the editing of a motion profile is performed. Thereafter automatic modification to corresponding motion profiles in the plurality of motion profiles associated with the avatar is performed based on the change to the motion profile. These modifications may be performed using a dedicated AI model trained to align motion profiles based on a change.

In another implementation, the user may edit a physiological characteristic, in one embodiment. For example, the avatar may be displayed in a user interface, wherein manipulation of the avatar may be performed by the user via the user interface, and received by the system (e.g., editor). The modifications may be made in any manner, such as through text, or manipulation of a representation of the avatar, etc. In that manner, the editing to the physiological characteristic by the user is performed. Thereafter automatic modification to corresponding motion profiles in the plurality of motion profiles associated with the avatar is performed based on the change to the physiological characteristic. These modifications may be performed using a dedicated AI model trained to align motion profiles based on a change. In particular, the method may include receiving editing of a physiological characteristic of the avatar. The method may further includes modifying and or editing each of a plurality of motion profiles of the avatar to be consistent with the physiological characteristic that is edited.

In another alternative implementation, the user may edit physiological characteristic and then also modify a corresponding motion profile. That is, the user may perform editing to a motion profile in a manner that is desired by the user, such as to be consistent with the edit to the physiological characteristic, or to have some unique motion profile that is now associated with the edited physiological characteristic. Thereafter, automatic modification to corresponding motion profiles in the plurality of motion profiles associated with the avatar is performed based on the change to the motion profile defined by the user. These modifications may be performed using a dedicated AI model trained to align motion profiles based on a change. In particular, the method may include receiving editing of a physiological characteristic of the avatar, such as through a user interface. The method may include editing of a motion profile of the avatar to be consistent with, or unique to, the physiological characteristic that is edited. The method may include modifying corresponding motion profiles of and/or each of a plurality of motion profiles to be consistent with the motion profile that edited.

At 340, the method including automatically generating a prompt to apply the resulting motion profile and/or plurality of motion profiles that is edited and/or modified to the avatar. In particular, the prompt is provided as input for an image generation artificial intelligence system configured to implement latent diffusion. That is, the prompt is generated based on the parameter that is edited, wherein the parameter defines a physiological characteristic or motion profile of the avatar. Based on the edited parameter, one or more corresponding motion profiles, of a plurality of motion profiles for the avatar, are further modified to be consistent with the edited parameter, as previously described.

In particular, the prompt is generated in a manner that is understood by the IGAI processing model, wherein the prompt is generated and input into the IGAI processing model to generate a sequence of images showing the motion of the avatar based on the plurality of motion profiles that have been modified. More specifically, at 350 the method includes generating a sequence of video frames using the image generation artificial intelligence system showing the avatar in motion based on the motion profile that is edited. The motion shown in the sequence of images may be related to the original motion profile that is edited, or may be identified by the user, or may be selected by the IGAI processing model.

At 360, the method including presenting the sequence of video frames in the user interface. That is, the user is provided with a visual representation of the changes made to the avatar. In that manner, the user may choose to accept the changes, or to make further edits and/or changes to the avatar. By performing an iterative editing process, a finalized avatar may be developed with desired physiological characteristics and/or motion profiles.

In one embodiment, the sequence of video frames are generated for use in a video game, or may be used within a mini-game of a full video game. For example, the IGAI processing model may be implemented to generate one or more motion sequences of a newly developed avatar, wherein a motion sequence may be embedded within the game. In that manner, the development of an avatar with characteristics desired by the user along with automatic modifications to the motion profiles for that avatar and the generation of a sequence of image frames showing a motion sequence can be quickly performed without, in part, having to modify each of the motion profiles, and making a separate request for a motion sequence.

Figure 4A:
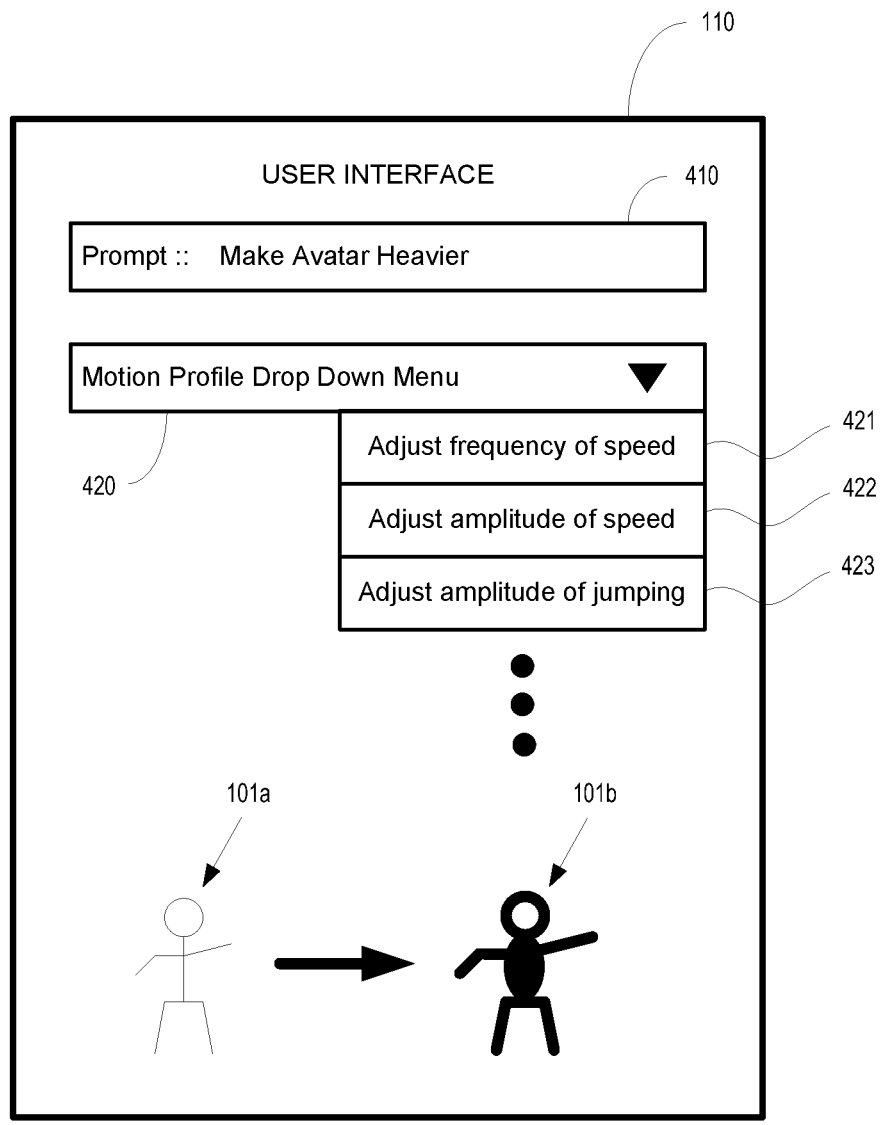
FIG. 4A illustrates a user interface including an interface for modifying a characteristic of an avatar, and a resulting drop down menu showing one or more editing actions to be taken for motion profiles of an avatar based on the modification of the characteristic, in accordance with one embodiment of the present disclosure.
Figure 4B:
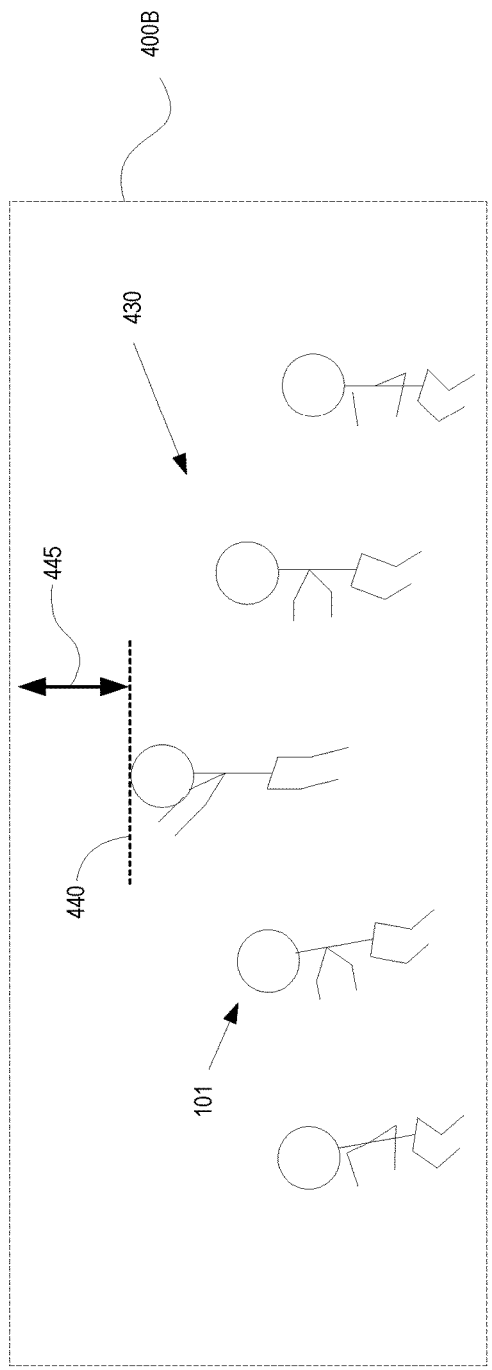
FIG. 4B illustrate an interface configured to enable modification of a motion profile, corresponding to jumping, of an avatar via user manipulation of a parameter of the motion profile, in accordance with one embodiment of the present disclosure.
Figure 4C:
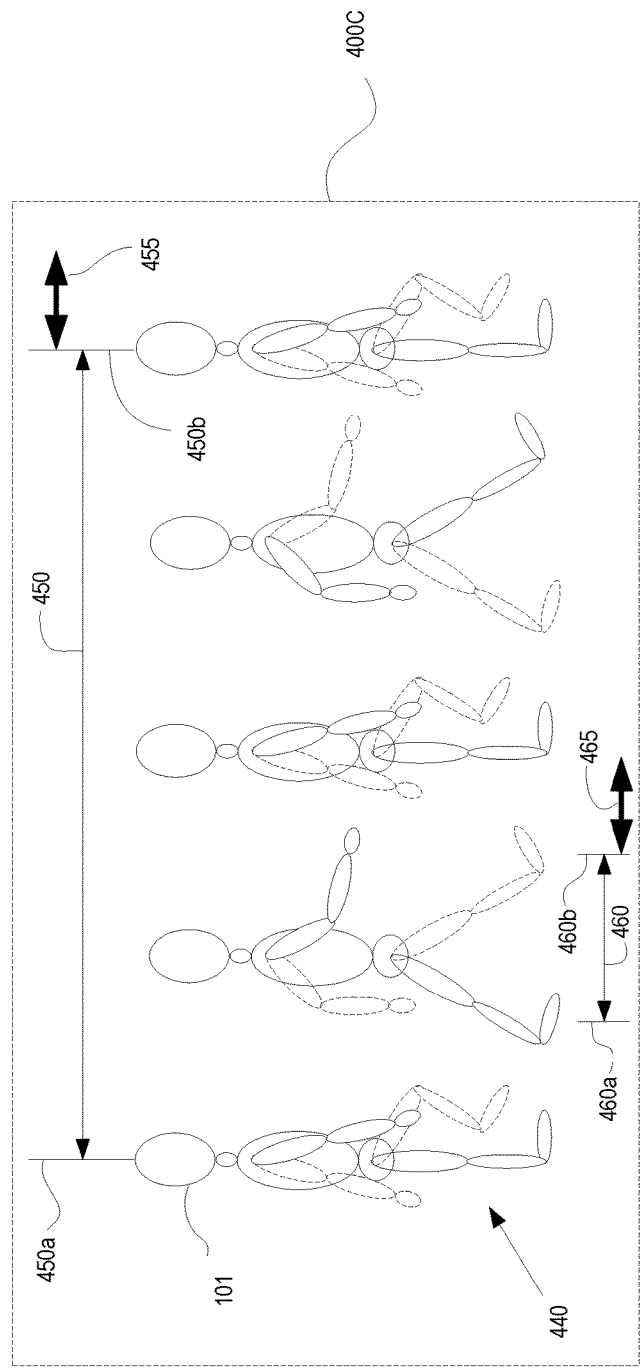
FIG. 4C illustrates an interface configured to enable modification of a motion profile, corresponding to walking and/or running, of an avatar via user manipulation of a parameter of the motion profile, in accordance with one embodiment of the present disclosure.

FIGS. 4A-4C illustrate exemplary methods for editing of a physiological characteristic and/or a motion profile of an avatar, wherein the avatar already is associated with a plurality of physiological characteristics and a suite or plurality of motion profiles. For example, the avatar may be under development or be finalized, and embodiments of the present disclosure may be implemented to provide further editing to the avatar, or to generate a different avatar. For example, a motion profile may be edited for frequency, or amplitude, or speed, etc.

FIG. 4A illustrates a user interface including a user interface 110 for modifying a physiological characteristic of an avatar 101, and a resulting drop down menu showing one or more editing actions to be taken for motion profiles of the avatar based on the modification of the physiological characteristic, in accordance with one embodiment of the present disclosure.

As shown, the user interface 110 may include an interface 410 that is configured for receiving and/or displaying a prompt. For example, the user may enter in a prompt to change a physiological characteristic of the avatar. In another example, the user may enter in a prompt to change a motion profile of the avatar. The prompt may be text based, wherein the user communicates the prompt through the interface 410. Also, the interface 410 may show a generated prompt based on communication by the user (e.g., via audio receiver), wherein the prompt is based on and/or translated from the communication.

For example, the prompt may be a request to "make avatar heavier," wherein a dedicated AI model associated with an editor (i.e., previously described) may be configured to make physiological changes and/or edits to the avatar. The user interface 110 may show the change in the avatar 101. Purely for illustration, the user interface 110 may show the avatar in a first state (i.e., as represented by avatar 101a), and after the change is made the user interface 110 may show the avatar and in a second state (i.e., as represented by avatar 101b), wherein the avatar is heavier based on the prompt.

In response to the physiological characteristic that has been edited, the user interface 110 may present a drop down interface 420 (e.g., drop down menu) that shows one or more menu items for editing of a corresponding motion profile of the avatar. The menu items may be related to motion profiles that could be changed in response to the physiological characteristic that has been edited, or may include all of the motion profiles of the avatar 101. For purposes of illustration only, FIG. 4A provides for editing of a motion profile for walking and/or running, as well as a motion profile for jumping, though it is appreciated that any motion profile may be edited.

For example, the drop down interface 420 may include a menu item 421 that may be selected to provide for editing of a walking and/or running motion profile, and more particularly for adjusting a frequency of the motion profile. The frequency may be associated with one cycle of the walking and/or running motion, wherein an increase in frequency may increase the speed of the avatar, wherein a decrease in frequency may decrease the speed of the avatar.

In another example, the drop down interface 420 may include a menu item 422 that may be selected to provide for editing of a walking and/or running motion profile, and more particularly for adjusting an amplitude of the motion profile. The amplitude may be associated with a top speed of the walking and/or running motion, wherein an increase in amplitude may increase the speed of the avatar, wherein a decrease in amplitude may decrease the speed of the avatar.

In another example, the drop down interface 420 may include a menu item 423 that may be selected to provide for editing a jumping motion profile, and more particularly for adjusting an amplitude of a jumping height of the motion profile. That is, the user may define how high the avatar may jump.

FIG. 4B illustrate an interface 400B that is configured to enable modification of a jumping motion profile that corresponds to a jumping motion of an avatar 101, wherein the modification may be performed in a visual and interactive manner for the user. The jumping motion profile may be shown as a sequence of images 430 showing the jumping motion. In particular, the interface 400B may be included within a user interface that enables interaction with a user. As shown, interface 400B provides for user manipulation of a parameter of the jumping motion profile, wherein the parameter defines a height of the jumping motion (e.g., average height, maximum height, etc.), as shown by an interactive line 440 shown in the sequence of images 430. For example, the height may be adjusted by raising or lower the interactive line 440, wherein raising the interactive line increases the height of the jumping motion in the corresponding motion profile, and lowering the interactive line decreases the height of the jumping motion in the corresponding motion profile. In particular, an adjustment 445 (e.g., raising or lowering) may be made to the height shown by line 440.

FIG. 4C illustrates an interface 400C configured to enable modification of a walking and/or running motion profile that corresponds to a walking and/or running motion of the avatar 101, wherein the modification may be performed in a visual and interactive manner for the user. The walking and/or running motion profile may be shown as a sequence of images 440. In particular, the interface 400C may be included within a user interface that enables interaction with a user. As shown, interface 400C provides for user manipulation of a parameter of the walking and/or running motion profile.

For example, one parameter may define a cycle 450 or period of the walking and/or running motion, wherein the cycle includes the movement of one leg front to back, and in reverse back to front again. The cycle 450 is shown including a start 450a to the cycle, and an end 450b to the cycle. For example, the cycle may be adjusted by increasing or decreasing the length of the cycle or period, wherein increasing the cycle may increase the speed of the motion, and a decrease in the cycle may decrease the speed of the motion. In particular, an adjustment 455 (e.g., increasing or decreasing the length of the cycle) may be made to the cycle 450.

In another example, one parameter may define a stride length 460 of the walking and/or running motion, wherein the stride length is the maximum distance achieved between a front leg and a rear leg. The stride length is shown as the distance between position 460a and position 460b. For example, the stride length 460 may be adjusted by increasing or decreasing the stride length, wherein increasing the stride length may increase the speed of the motion, and a decrease in the stride length may decrease the speed of the motion. In particular, an adjustment 465 may be made to adjust the stride length shorter or longer.

FIG. 4D illustrates an interface 400D configured to enable modification of a motion profile that corresponds to a walking and/or running motion of an avatar via user manipulation of key frames, in accordance with one embodiment of the present disclosure. The interface 400D may be included in a user interface enabling interaction with a user. As shown, the walking and/or running motion profile may be represented as a sequence of images 470 that includes including frames 470a-470e. The sequence of images 470 illustrates a full cycle of the walking and/or running motion, such as including the movement of one leg front to back, and in reverse back to front again.

The cycle of the walking and/or running motion may be represented in the interface 400D by key frames. For example, key frame 470a may be a start to the cycle, and key frame 470e may indicate an ending point of the representation of the cycle. In particular, the two key frames may be used to represent all the key frames (e.g., frames 470a-470e) within the cycle. Further, the ending point may or may not be located at the actual end of the cycle indicated by key frame 470e as the manipulation of the key frames can be transposed and/or translated to the full cycle. For example, the ending key frame may be indicated as key frame 470d.

As shown interface 400D provides for user manipulation of a parameter of the walking and/or running motion profile, wherein the parameter may define a length 480 between key frames 470a and 470e. For example, the cycle of the walking and/or running motion may be adjusted by increasing or decreasing the length of the cycle, wherein increasing the length 480 of the cycle may increase the speed of the motion, and a decrease in the length cycle may decrease the speed of the motion. In particular, an adjustment 485 (e.g., increasing or decreasing the length of the cycle) may be made to the length 480 of the cycle.

In particular, a method for adjusting a parameter of a motion profile using key frames may include generating a starting key frame including a first pose of the avatar. The method may include generating an ending key frame including a second pose of the avatar. The key frames may include the full cycle of a walking and/or running motion, for example. The method may include generating a prompt for applying the motion profile that is edited to the starting key frame and the ending key frame, wherein the prompt is provided as input into the image generating artificial intelligence system. The method may include generating a sequence of video frames using an image generation artificial intelligence system based on the motion profile that is edited using the starting key frame and the ending key frame as reflected in the prompt.

Figure 5:
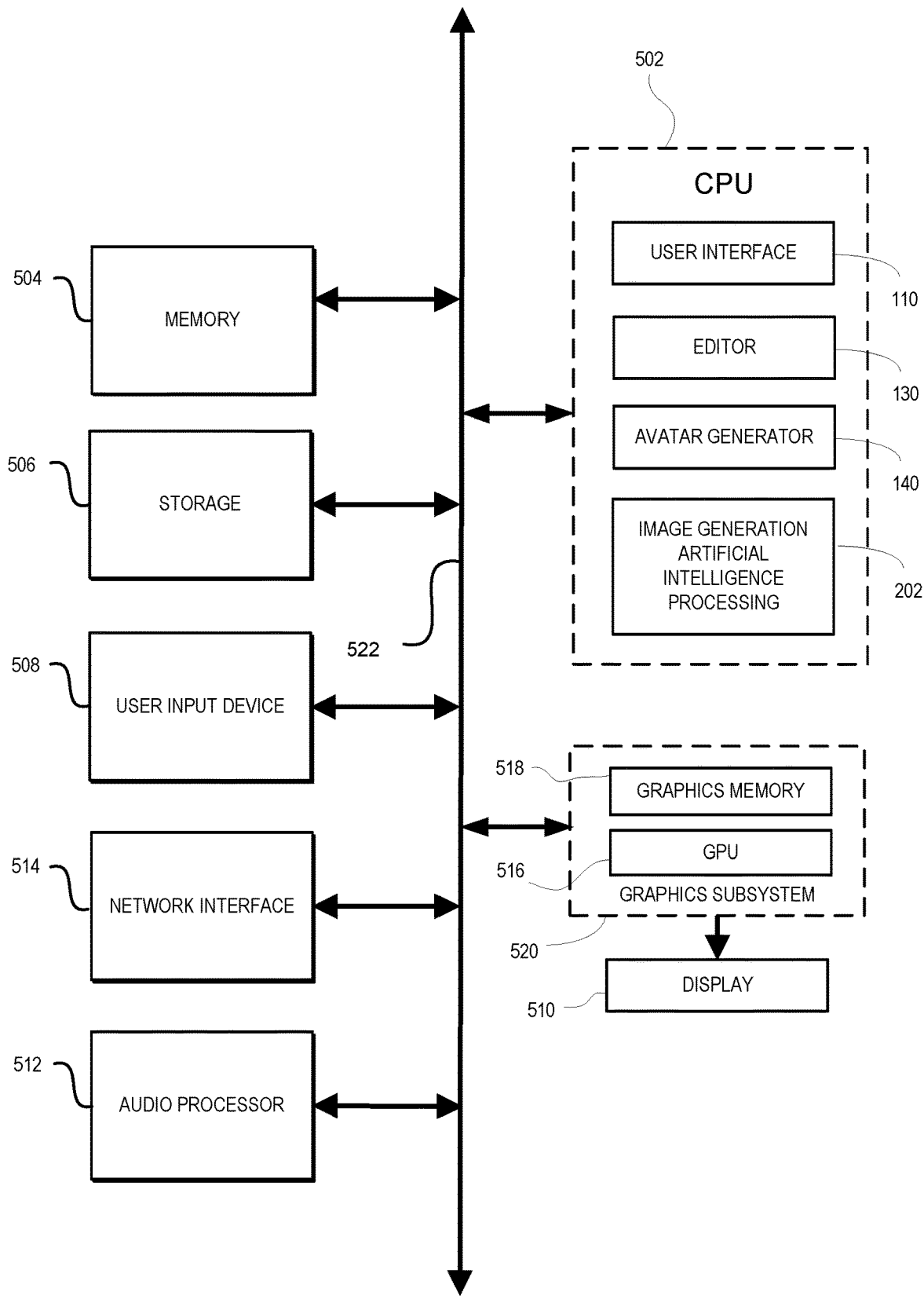
FIG. 5 illustrates components of an example device that can be used to perform aspects of the various embodiments of the present disclosure.

FIG. 5 illustrates components of an example device 500 that can be used to perform aspects of the various embodiments of the present disclosure. This block diagram illustrates a device 500 that can incorporate or can be a personal computer, video game console, personal digital assistant, a server or other digital device, suitable for practicing an embodiment of the disclosure. Device 500 includes a central processing unit (CPU) 502 for running software applications and optionally an operating system. CPU 502 may be comprised of one or more homogeneous or heterogeneous processing cores. For example, CPU 502 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 500 may be a localized to a player playing a game segment (e.g., game console), or remote from the player (e.g., back-end server processor), or one of many servers using virtualization in a game cloud system for remote streaming of gameplay to clients, or for implementing additional services such as a supervisor functionality.

In particular, CPU 502 may be configured to implement a user interface 110 that enables editing of a parameter (e.g., physiological characteristic and/or motion profile) of an avatar, and for viewing a resulting motion sequence of the avatar. Further, CPU 502 may be configured to implement an editor 120 that is configured for facilitating editing of a parameter of avatar, wherein the parameter may define a physiological characteristic and/or a motion profile of avatar 101. In addition, the CPU 502 may be configured to implement an avatar generator 140 that may be used to develop an avatar and/or object, including defining one or more physiological characteristics and/or one more motion profiles associated with the avatar. Also, CPU 502 may be configured to implement a IGAI processing model 202 configured to generate an image or sequence of images using latent diffusion techniques showing motion of an avatar based on a prompt that is generated related to the editing of a parameter of the avatar defining a physiological characteristic and/or a motion profile and after a suite or plurality of motion profiles have been modified to be consistent with the edited parameter. As a result, an avatar may be developed having desired physiological characteristics and/or motion profiles, and a sequence of images may be generated using the IGAI processing model to show the motion of the avatar based on the requested edits made to the avatar.

Memory 504 stores applications and data for use by the CPU 502. Storage 506 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 508 communicate user inputs from one or more users to device 500, examples of which may include keyboards, mice, joysticks, touch pads, touch screens, still or video recorders/cameras, tracking devices for recognizing gestures, and/or microphones. Network interface 514 allows device 500 to communicate with other computer systems via an electronic communications network, and may include wired or wireless communication over local area networks and wide area networks such as the internet. An audio processor 512 is adapted to generate analog or digital audio output from instructions and/or data provided by the CPU 502, memory 504, and/or storage 506. The components of device 500, including CPU 502, memory 504, data storage 506, user input devices 508, network interface 510, and audio processor 512 are connected via one or more data buses 522.

A graphics subsystem 520 is further connected with data bus 522 and the components of the device 500. The graphics subsystem 520 includes a graphics processing unit (GPU) 516 and graphics memory 518. Graphics memory 518 includes a display memory (e.g., a frame buffer) used for storing pixel data for each pixel of an output image. Graphics memory 518 can be integrated in the same device as GPU 516, connected as a separate device with GPU 516, and/or implemented within memory 504. Pixel data can be provided to graphics memory 518 directly from the CPU 502. Alternatively, CPU 502 provides the GPU 516 with data and/or instructions defining the desired output images, from which the GPU 516 generates the pixel data of one or more output images. The data and/or instructions defining the desired output images can be stored in memory 504 and/or graphics memory 518. In an embodiment, the GPU 516 includes 3D rendering capabilities for generating pixel data for output images from instructions and data defining the geometry, lighting, shading, texturing, motion, and/or camera parameters for a scene. The GPU 516 can further include one or more programmable execution units capable of executing shader programs. In one embodiment, GPU 516 may be implemented within an AI engine (e.g., machine learning engine 190) to provide additional processing power, such as for the AI, machine learning functionality, or deep learning functionality, etc.

The graphics subsystem 520 periodically outputs pixel data for an image from graphics memory 518 to be displayed on display device 510. Display device 510 can be any device capable of displaying visual information in response to a signal from the device 500, including CRT, LCD, plasma, and OLED displays. Device 500 can provide the display device 510 with an analog or digital signal, for example.

In other embodiments, the graphics subsystem 520 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g., if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g., a first shader operation) and compositing of outputs from slave GPU 2 and slave GPU 3, wherein slave GPU 2 could perform a second shader (e.g., fluid effects, such as a river) operation, the slave GPU 3 could perform a third shader (e.g., particle smoke) operation, wherein master GPU 1 composites the results from each of GPU 1, GPU 2, and GPU 3. In that manner, different GPUs can be assigned to perform different shader operations (e.g., flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, in various embodiments the present disclosure describes systems and methods configured for avatar generation, such as during development of a sequence of images including the avatar as content, including content for a video game, and more specifically to the modification of a physiological characteristic of the avatar and/or a motion profile of the avatar, aligning related motion profiles of the avatar to be consistent with the modification, and generating an image and/or sequence of images of the avatar in motion based on the motion profiles that have been modified using an image generation artificial intelligence system configured to implement latent diffusion.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

Access to the cloud gaming network by the client device may be achieved through a communication network implementing one or more communication technologies. In some embodiments, the network may include $5^{th}$ Generation (5G) network technology having advanced wireless communication systems. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in the prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g., tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

With the above embodiments in mind, it should be understood that embodiments of the present disclosure can employ various computer-implemented operations involving data stored in computer systems. These operations are those requiring physical manipulation of physical quantities.

Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation may be produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:
    accessing an avatar including a plurality of physiological characteristics and a plurality of motion profiles, wherein each motion profile is predefined and defines a plurality of distinct motions performed by the avatar in a virtual environment, and wherein each motion profile is represented as a sequence of images having a length comprising a starting key frame including a first pose of the avatar and an ending key frame including a second pose of the avatar;
    receiving editing of a motion profile in the plurality of motions profiles of the avatar via a user interface, wherein editing of the motion profile comprises an adjustment to a parameter associated with the length of the sequence of images;
    modifying each of the plurality of motion profiles to be consistent with the motion profile that is edited by automatically generating a prompt to apply, for each motion profile of the plurality of motion profiles, the motion profile that is edited to the starting key frame and the ending key frame, wherein the prompt is provided as input for an image generation artificial intelligence system configured to implement latent diffusion;
    generating a sequence of video frames using the image generation artificial intelligence system showing the avatar in motion based on the prompt, the motion profile that is edited, and the starting key frame and the ending key frame; and
    presenting the sequence of video frames in the user interface.

2. The method of claim 1, further comprising:
    receiving, via the user interface, feedback regarding the motion profile that is edited;
    providing further editing of the motion profile that is edited based on the feedback;
    generating another prompt to apply the motion profile that is further edited to the avatar; and
    generating another sequence of video frames using the image generation artificial intelligence system showing the avatar in another motion based on the motion profile that is further edited.

3. The method of claim 1, further comprising:
    receiving editing of a physiological characteristic of the avatar; and
    editing each of the plurality of motion profiles of the avatar to be consistent with the physiological characteristic that is edited.

4. The method of claim 3, further comprising:
    displaying the avatar in the user interface; and
    receiving manipulation of the avatar to generate the editing of the physiological characteristic.

5. The method of claim 1, further comprising:
    receiving editing of a physiological characteristic of the avatar via the user interface;
    editing the motion profile of the avatar to be consistent with the physiological characteristic that is edited; and
    modifying each of the plurality of motion profiles to be consistent with the motion profile that edited.

6. The method of claim 1, wherein the editing a motion profile includes at least one of:
    receiving editing of a frequency of the motion profile;
    receiving editing of an amplitude of the motion profile; and
    receiving editing of a speed of the motion profile.

7. The method of claim 1,
    wherein the length of the sequence of images defines a cycle of complete motion of the avatar, and wherein the adjustment to the parameter associated with the length comprises:
    increasing or decreasing the length of the cycle, wherein increasing the length of the cycle increases a speed of motion of the avatar, and wherein decreasing the length of the cycle decreases the speed of motion of the avatar.

8. A non-transitory computer-readable medium storing a computer program for performing a method, the computer-readable medium comprising:
    program instructions for accessing an avatar including a plurality of physiological characteristics and a plurality of motion profiles, wherein each motion profile is predefined and defines a plurality of distinct motions performed by the avatar in a virtual environment, and wherein each motion profile is represented as a sequence of images having a length comprising a starting key frame including a first pose of the avatar and an ending key frame including a second pose of the avatar;

program instructions for receiving editing of a motion profile in the plurality of motions profiles of the avatar via a user interface, wherein editing of the motion profile comprises an adjustment to a parameter associated with the length of the sequence of images;

program instructions for modifying each of the plurality of motion profiles to be consistent with the motion profile that is edited by automatically generating a prompt to apply, for each motion profile of the plurality of motion profiles, the motion profile that is edited to the starting key frame and the ending key frame, wherein the prompt is provided as input for an image generation artificial intelligence system configured to implement latent diffusion;

program instructions for generating a sequence of video frames using the image generation artificial intelligence system showing the avatar in motion based on the prompt, the motion profile that is edited, and the starting key frame and the ending key frame; and program instructions for presenting the sequence of video frames in the user interface.

9. The non-transitory computer-readable medium of claim 8, further comprising:

program instructions for receiving, via the user interface, feedback regarding the motion profile that is edited;

program instructions for providing further editing of the motion profile that is edited based on the feedback;

program instructions for generating another prompt to apply the motion profile that is further edited to the avatar; and program instructions for generating another sequence of video frames using the image generation artificial intelligence system showing the avatar in another motion based on the motion profile that is further edited.

10. The non-transitory computer-readable medium of claim 8, further comprising:

program instructions for receiving editing of a physiological characteristic of the avatar; and program instructions for editing each of the plurality of motion profiles of the avatar to be consistent with the physiological characteristic that is edited.

11. The non-transitory computer-readable medium of claim 10, further comprising:

program instructions for displaying the avatar in the user interface; and program instructions for receiving manipulation of the avatar to generate the editing of the physiological characteristic.

12. The non-transitory computer-readable medium of claim 8, further comprising:

program instructions for receiving editing of a physiological characteristic of the avatar via the user interface;

program instructions for editing the motion profile of the avatar to be consistent with the physiological characteristic that is edited; and program instructions for modifying each of the plurality of motion profiles to be consistent with the motion profile that edited.

13. The non-transitory computer-readable medium of claim 8, wherein the editing a motion profile includes at least one of:

program instructions for receiving editing of a frequency of the motion profile;

program instructions for receiving editing of an amplitude of the motion profile; and program instructions for receiving editing of a speed of the motion profile.

14. The non-transitory computer-readable medium of claim 8, further comprising:

wherein the length of the sequence of images defines a cycle of complete motion of the avatar, and wherein the adjustment to the parameter associated with the length comprises:

program instructions for increasing or decreasing the length of the cycle, wherein increasing the length of the cycle increases a speed of motion of the avatar, and wherein decreasing the length of the cycle decreases the speed of motion of the avatar.

15. A computer system comprising:

a processor;

a memory coupled to the processor and having stored therein instructions that, if executed by the computer system, cause the computer system to execute a method, comprising:

accessing an avatar including a plurality of physiological characteristics and a plurality of motion profiles, wherein each motion profile is predefined and defines a plurality of distinct motions performed by the avatar in a virtual environment, and wherein each motion profile is represented as a sequence of images having a length comprising a starting key frame including a first pose of the avatar and an ending key frame including a second pose of the avatar;

receiving editing of a motion profile in the plurality of motions profiles of the avatar via a user interface, wherein editing of the motion profile comprises an adjustment to a parameter associated with the length of the sequence of images;

modifying each of the plurality of motion profiles to be consistent with the motion profile that is edited by automatically generating a prompt to apply, for each motion profile of the plurality of motion profiles, the motion profile that is edited to the starting key frame and the ending key frame, wherein the prompt is provided as input for an image generation artificial intelligence system configured to implement latent diffusion;

generating a sequence of video frames using the image generation artificial intelligence system showing the avatar in motion based on the prompt, the motion profile that is edited, and the starting key frame and the ending key frame; and presenting the sequence of video frames in the user interface.

16. The computer system of claim 15, the method further comprising:

receiving, via the user interface, feedback regarding the motion profile that is edited;

providing further editing of the motion profile that is edited based on the feedback;

generating another prompt to apply the motion profile that is further edited to the avatar; and generating another sequence of video frames using the image generation artificial intelligence system showing the avatar in another motion based on the motion profile that is further edited.

17. The computer system of claim 15, the method further comprising:

receiving editing of a physiological characteristic of the avatar; and editing each of the plurality of motion profiles of the avatar to be consistent with the physiological characteristic that is edited.

18. The computer system of claim 15, the method further comprising:
  receiving editing of a physiological characteristic of the avatar via the user interface;
  editing the motion profile of the avatar to be consistent with the physiological characteristic that is edited; and
  modifying each of the plurality of motion profiles to be consistent with the motion profile that edited.

19. The computer system of claim 15, wherein in the method the editing a motion profile includes at least one of:
  receiving editing of a frequency of the motion profile;
  receiving editing of an amplitude of the motion profile; and
  receiving editing of a speed of the motion profile.

20. The computer system of claim 15,
  wherein the length of the sequence of images defines a cycle of complete motion of the avatar, and wherein the adjustment to the parameter associated with the length comprises:
  increasing or decreasing the length of the cycle, wherein increasing the length of the cycle increases a speed of motion of the avatar, and wherein decreasing the length of the cycle decreases the speed of motion of the avatar.

* * * * *